Figure 1:
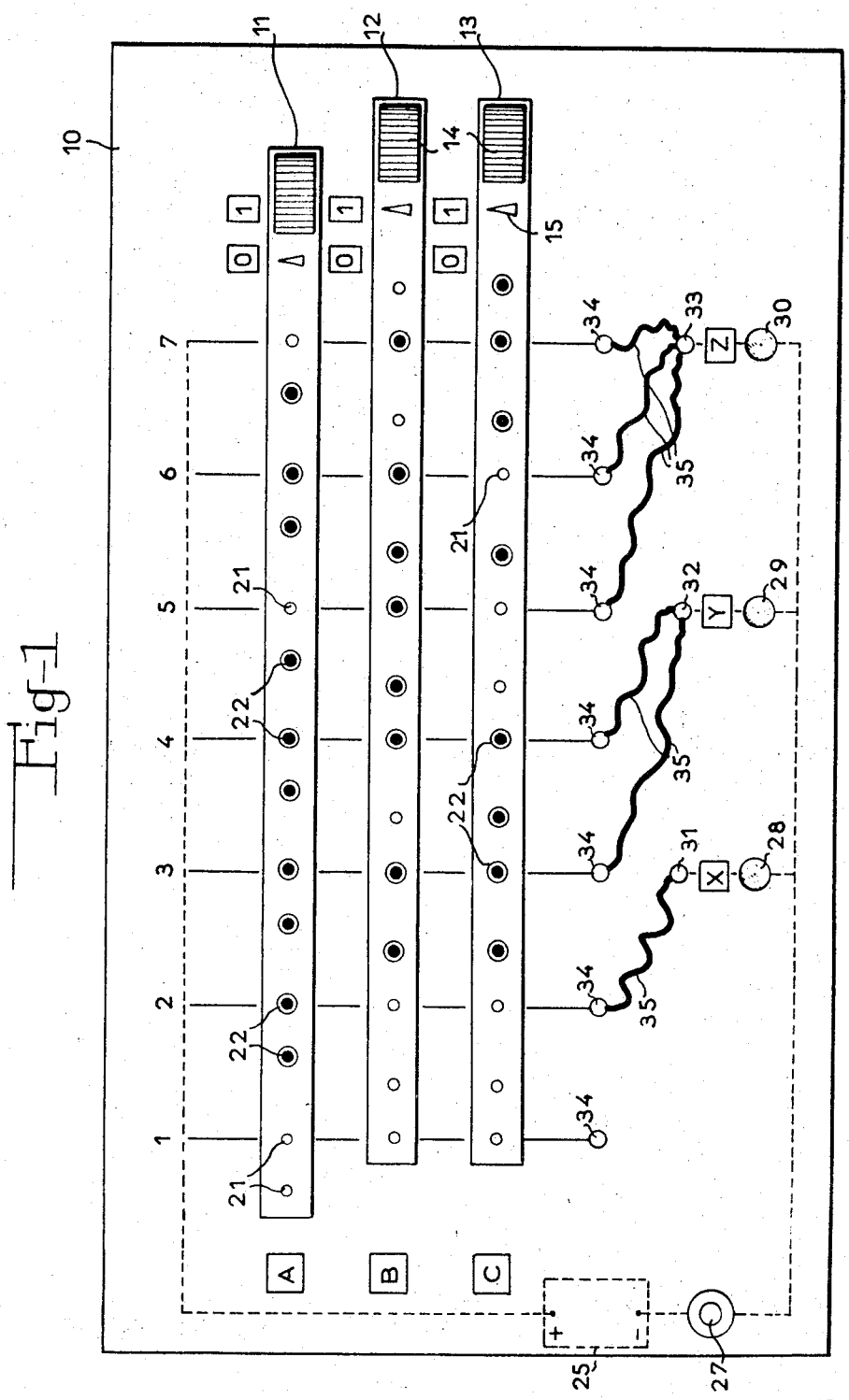

United States Patent
Chamecki

[15] 3,680,228
[45] Aug. 1, 1972

[54] TOY ELECTRIC COMPUTER
[72] Inventor: Samuel S. Chamecki, Paris, France
[73] Assignee: Les Jouets Rationnels
[22] Filed: Oct. 27, 1970
[21] Appl. No.: 84,263

[30] Foreign Application Priority Data
Nov. 27, 1969 France..........................6940860

[52] U.S. Cl......................................................35/30
[51] Int. Cl................................................G09b 5/00
[58] Field of Search................................35/19 A, 30

[56] References Cited
UNITED STATES PATENTS

| | | | |
|---|---|---|---|
| 1,705,315 | 3/1929 | States............................ | 35/19 A |
| 3,363,334 | 1/1968 | Watkin ......................... | 35/30 X |
| 3,568,335 | 3/1971 | Nehmann ........................ | 35/30 |

FOREIGN PATENTS OR APPLICATIONS

| | | | |
|---|---|---|---|
| 1,578,828 | 7/1969 | France.............................. | 35/30 |

Primary Examiner—Harland S. Skogquist
Attorney—Woodhams, Blanchard & Flynn

[57] ABSTRACT

A toy electrical computer comprises a set of switches arranged in lines and in columns and mobile bars representing input data and movable into two different positions. Each mobile bar is provided with opening therein for the reception of detachable pegs having conducting portions, the number and arrangement of the pegs in the openings being variable in dependence upon the selected program. A plurality of indicators each represent an output datum and each is connectable between an electric current supply source and one or more of the columns of switches in accordance with the selected program. The switches of each column are connected in series by means of substantially C-shaped, resilient conducting blades the two legs of which respectively form terminals of two adjacent switches of the column. The adjacent legs of adjacent blades in a column are insulated from each other except when electrically interconnected by way of said peg conducting portion.

3 Claims, 3 Drawing Figures

INVENTOR
SAMUEL S. CHAMECKI
BY
Woodhams, Blanchard & Flynn
ATTORNEYS

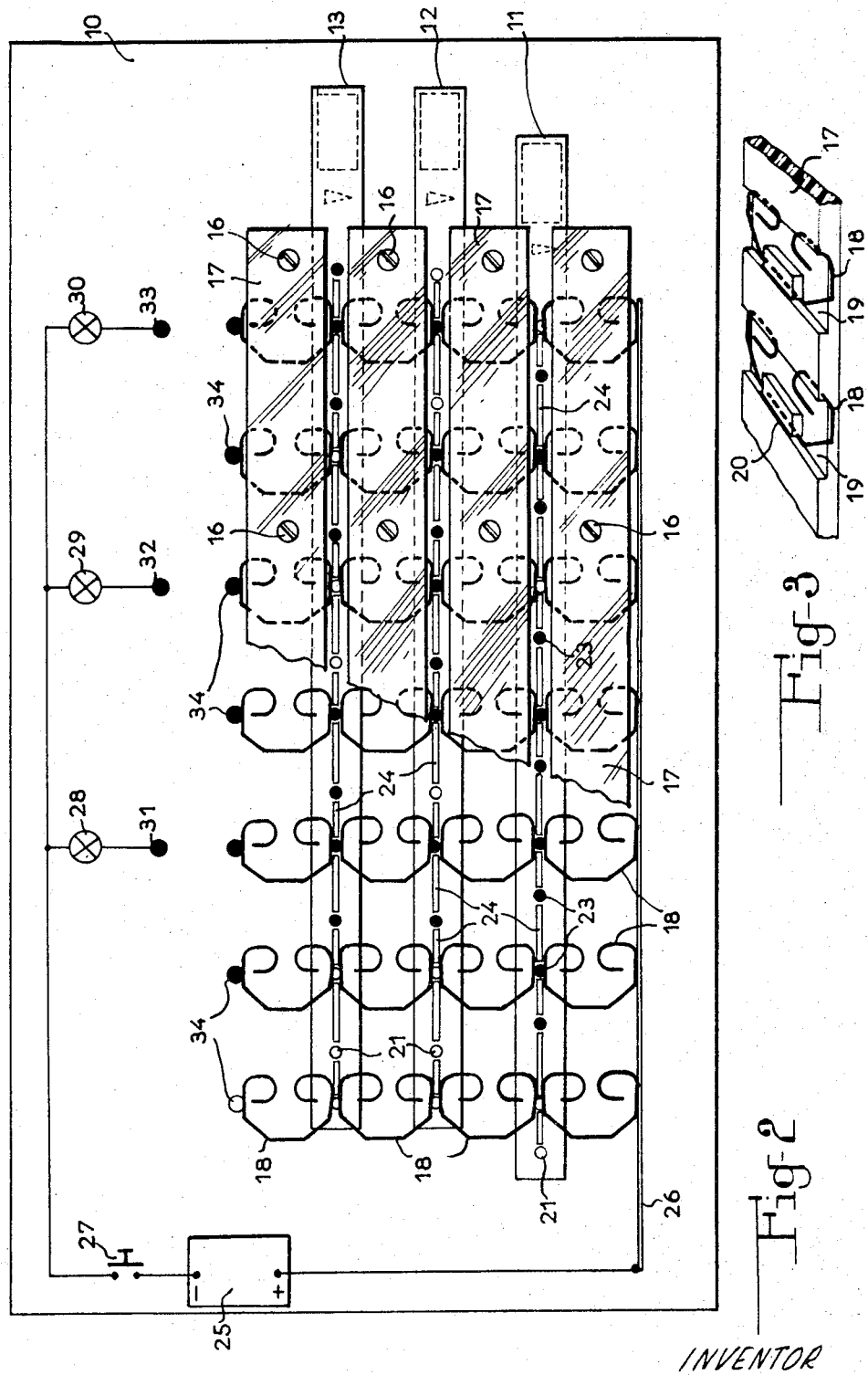

TOY ELECTRIC COMPUTER

The invention relates to a toy electrical computer.

Such toy computers are scientific toys which make it possible to learn in a simple and agreeable manner the operating principles of a real electronic computer. However, toy electrical computers known so far are generally very fragile and their use is thus not very suitable, particularly for children. MOreover, they are frequently very costly.

The present invention has the object of providing an electrical computer which is simple and inexpensive, but nevertheless functionally very reliable in use.

According therefore to the present invention, there is provided a toy electrical computer comprising a set of switches arranged both in lines and in columns, mobile bars representing input data and movable into two different positions, each mobile bar being provided with openings therein for the reception of detachable pegs having conducting portions, the number and arrangement of the pegs in the openings being variable in dependence upon the selected program, a plurality of indicators each of which represents an output datum and each of which is connectible between an electric current supply source and one or more of the columns of switches in accordance with the selected program, the switches of each column being connected in series by means of substantially C-shaped, resilient conducting blades the two legs of which respectively form terminals of two adjacent switches of the column, the adjacent legs of adjacent blades in a column being insulated from each other except when electrically interconnected by way of a said peg conducting portion.

In one particular embodiment of the invention, the blades are mounted in rows of fixed plates of insulating material arranged on opposite sides of the mobile bars, each plate carrying all the blades belonging to one and the same line of switches.

It can easily be seen that such an electric computer represents a simple and cheap construction. MOreover, since the blades are substantially C-shaped, good electric contacts are always assured in the different positions required by the program. The use of simple pegs for making the contacts makes it also possible to change the program very easily and quickly when this is required.

The invention is illustrated, merely by way of example, in the accompanying drawings, in which:

FIG. 1 is a simplified plan view of the front face of a toy electrical computer according to the invention, FIG. 2 is a plan view of the rear face of the toy computer, shown partially broken away, FIG. 3 is a perspective view on a larger scale of one of the plates carrying the blades of the toy computer according to the invention.

The toy electrical computer shown in FIGS. 1 and 2 comprises firstly a base 10 formed by a plate of rectangular shape which may be made for example of plastics material. The base 10 carries all the elements forming the toy computer and is adapted to be mounted on a suitable box, not shown in the drawing.

The toy electrical computer comprises generally, as known per se, a set of switches arranged both in horizontal lines and in vertical columns. In the particular embodiment described here there are seven columns of switches. These seven columns are symbolised on the front face of the base 10 by vertical lines and are numbered from 1 to 7. There are three lines of switches and these are symbolised by three bars 11, 12 and 13, representing respectively one of three input data A, B and C of the toy computer. Thus there are seven columns of three switches each, altogether twenty one switches, each switch being located at the level of the intersection of one of the columns 1 to 7, with one of the bars 11, 12 and 13.

Each bar 11, 12 and 13 is adapted to slide longitudinally in a slot of the base 10 so as to occupy two different positions which correspond, respectively, to the states "0" and "1" of input data A, B and C of the toy computer. To this end, each bar is provided with a knob 14 by means of which each bar may be moved longitudinally, and with an index 15 which collaborates with two references 0 and 1 on the front face of the base 10.

Mounted on the rear face of the base 10 by means of screws such as 16 are four plates 17 of insulating material arranged on either side of the mobile bars 11, 12 and 13. Each of the plates 17 carries seven resilient, substantially, C-shaped, conducting blades 18 corresponding respectively to the seven columns of the switches of the toy computer. At least one of the two legs of each C-shaped blade 18 forms one of the terminals of one of the switches, as will be explained in greater detail further below.

Referring now to the perspective view of FIG. 3, it can be seen that the plates 17 are provided with cavities such as 19 adapted to receive each one of the blades 18. Each blade 18 is retained in the corresponding cavity 19 of the plate by means of a shoulder 20, forming a slot in which the center web of the blade is located. Moreover, the dimensions of each cavity 19 are such that the two legs of the respective blade 18 are resiliently forced to project outwardly on either side of the plate.

The mobile bars 11, 12 and 13 are also made from insulating material, for example, as synthetic resin, and are provided with a certain number of cylindrical holes 21. Each hole 21 is adapted to receive a detachable peg 22. Each peg 22 has a lower conducting part 23 which is flush with the rear face of the base 10, and is electrically engagable with and disengagable from the adjacent legs of two blades 18 in order to close and open the switch formed therebetween. There are two holes 21 per column of switches, i.e., seven pairs of holes for each bar. Moreover, the two holes of each pair are so arranged that they are alternatively in alignment with the corresponding column of switches according to whether the bar is in one or the other of its two positions. This particular arrangement of the holes 21 can be seen quite clearly from FIG. 1. Naturally, the number and distribution of the pegs 22 in the holes 21 are determined by the program of the problem which is to be solved by the toy computer.

The mobile bars 11, 12 and 13 comprise, between the holes 21, insulating ribs 24 which project on the rear face of the base 10. The blades 18 of each column of switches are electrically insulated thereby from each other, and can make contact only by means of the pegs 22. Owing to this arrangement, the closure or opening of a certain switch of the toy computer depends only on the presence or absence of pegs 22 in the corresponding holes 21, and on the position of the mobile bar.

The toy computer is provided with a supply source of electric current, in this case by a battery 25. One of the terminals of this battery, for example the positive terminal, is electrically connected to each of the seven columns of switches by means of a metal rod 26 against which resiliently bear the free legs of the blades 18 which collaborate with the mobile bar 11. The other terminal of the battery is connected through a push button switch 27 to one of the ends of three light indicators 28, 29 and 30, which represent respectively three output data X, Y and Z of the toy computer. Each of the output data X, Y and Z may have two different meanings according to whether the corresponding indicator is alight or not.

The other ends of the indicators 28, 29 and 30 are respectively connected to sockets 31, 32 and 33, respectively. The free ends of the blades 18 which collaborate with the mobile bar 13 each resiliently bear against a socket such as 34. Owing to this arrangement, it is possible, by means of suitable pegs and flexible leads such as 35, to connect each socket 31, 32 and 33 to one or more of the sockets 34, in accordance with the chosen program. In this manner, each indicator 28, 29 and 30 is connected to the terminals of the battery 25 through one or more of the columns of the switches. The lighting up or the extinction of these indicators depends therefore substantially on the presence or on the absence of pegs 22 in the holes 21, i.e., on the program of the toy computer.

To illustrate the operation of the toy computer we shall discuss one particular application, for example the problem of the automatic control of a lift.

The conditions of use of this lift require, for example, the following:

a. When the lift is stopped on a floor level, the door is unblocked and the motor is stopped;

b. When the lift is called from the top or bottom, the door is closed, the motor is started, and the lift travels in the direction of the call;

c. If the lift is called simultaneously from the top and bottom, it gives priority to the direction in which it travelled prior to its stopping.

Let it be assumed, for example, that the input: A represents the travel prior to the call (so that if the lift was travelling up $A = 1$, and if the lift was travelling down $A = 0$); B represents the call button from the top (so that in the case of a call $B = 1$, and in the absence of a call $B = 0$); C represents the call button from below (so that in the case of a call $C = 1$, and in the absence of a call $C = 0$).

At the output:

X represents the control of the door (so that if the corresponding indicator 28 is alight, it indicates that the door is unblocked, and when it is extinguished it means that the door is blocked);

Y represents the control of the motor (so that if the corresponding indicator 29 is alight, it indicates that the motor is running, and when it is extinguished it indicates that the motor is stopped);

Z represents the travel prior to the call (so that if the corresponding indicator 30 is alight, it indicates that the lift is travelling up, and when it is extinguished it indicates that the lift is travelling down).

Using, for example, Boolean algebra it can be said that:

$X = \bar{B} \cdot \bar{C}$ $Y = B + C$ and $Z = A \cdot \bar{C} + B \cdot \bar{C} + A \cdot B$.

These three relations between the input data A, B, C and the output data X, Y, Z indicate directly the distribution of the pegs 22 in the holes 21 of the mobile bars 11, 12 and 13, and the connections 35 which must be made between the indicators and the different columns of switches of the toy computer. It can be seen, for example, that one requires one column of switches for X, two columns for Y, and three columns for Z, i.e., a total of six columns.

Thus, in a first stage and for this particular problem of the automatic control of a lift, the programming of the computer consists in connecting the socket 31 with the socket 34 in column 2, in connecting the socket 32 to the sockets 34 of columns 3 and 4, and connecting the socket 33 with the sockets 34 of columns 5, 6 and 7, i.e., as shown in FIG. 1. It will be noted that column 1 remains unused since this particular program requires only six columns of switches. The second stage of the programming consists in inserting pegs 22 into the holes 21 of the mobile bars in the positions defined by this program. This distribution of the pegs 22 in the holes 21 is exactly as shown in FIG. 1.

The toy computer programmed in this manner can respond immediately and without error to different questions which arise during the operation of the lift. Let it be assumed, for example, that we want to know how the lift responds when a call comes simultaneously from the top and bottom, under the assumption that the lift was travelling downwards prior to the call.

These different data are translated as $A = 0$, $B = 1$, and $C = 1$. Thus, the mobile bar 11 will be placed into the zero position, and the bars 12 and 13 into the position 1. When the push button 27 is depressed which transmits electrical energy to the various columns of switches of the computer, it can be seen that the indicator 29 lights up, whilst the indicators 28 and 30 remain unlit. As will be clearly seen from FIGS. 1 and 2, in this particular position of the mobile bars, all switches are closed by pegs 22 only in the columns 3 and 4.

This result shows that the door is blocked (indicator 28 extinguished), that the motor is running (indicator 29 lit up), and that the lift travels down (indicator 30 extinguished).

Owing to the resilience of the blades 18 which collaborate with the detachable pegs 22 to form the switches of the computer, there is normally no risk of bad electrical contact. The toy computer therefore, has a high degree of operational reliability. It should be noted that bad contacts are particularly undesirable in the case of an electrical computer because they may give rise to faulty results.

Moreover, the detachable pegs 22 make it possible to change the program very quickly and easily, if desired. It should also be noted that, in order to prevent damage to the blades 18, the mobile bars 11, 12 and 13 are preferably placed in an immediate position, i.e., between 0 and 1, prior to programming the computer. When the bars are in this intermediate position, the legs of the blades 18 engage the ribs 24 and cannot make contact with the conducting parts 23 of the pegs 22.

I claim:

1. A toy electrical computer comprising a set of switches arranged both in lines and in columns, mobile bars representing input data and movable into two different positions, each mobile bar being provided with openings therein for the reception of detachable pegs having conducting portions, the number and arrangement of the pegs in the openings being variable in dependence upon the selected program, a plurality of indicators each of which represents an output datum and each of which is connectible between an electric current supply source and one or more of the columns of switches in accordance with the selected program, the switches of each column being connected in series by means of substantially C-shaped resilient conducting blades, the two legs of which respectively form terminals of two adjacent switches of the column, the adjacent legs of adjacent blades in a column being insulted from each other except when electrically interconnected by way of a said peg conducting portion.

2. A toy electrical computer as claimed in claim 1, in which the blades are mounted in rows of fixed plates of insulating material arranged on opposite sides of the mobile bars, each plate carrying all the blades belonging to one and the same line of switches.

3. A toy electrical computer as claimed in claim 2 in which each blade extends outwardly of its respective plate and is adapted to bear resiliently against a said peg.

* * * * *